INVENTORS
TERENCE MARTIN EULING
JOHN WILDEY PHIPPS
AUBREY WILSON

Nov. 16, 1965 T. M. EULING ETAL 3,218,380
PROCESS AND APPARATUS FOR THE MANUFACTURE OF THERMOPLASTIC FILM
Filed Feb. 9, 1962

INVENTORS
TERENCE MARTIN EULING
JOHN WILDEY PHIPPS
AUBREY WILSON

BY Cushman, Darby & Cushman
ATTORNEYS

Nov. 16, 1965 T. M. EULING ETAL 3,218,380
PROCESS AND APPARATUS FOR THE MANUFACTURE OF THERMOPLASTIC FILM
Filed Feb. 9, 1962 4 Sheets-Sheet 4

INVENTORS
TERENCE MARTIN EULING
JOHN WILDEY PHIPPS
AUBREY WILSON

BY Cushman, Darby, Cushman
ATTORNEYS 3,218,380
PROCESS AND APPARATUS FOR THE MANU-
FACTURE OF THERMOPLASTIC FILM
Terence Martin Euling, Welwyn Garden City, John Wildey Phipps, High Welwyn, and Aubrey Wilson, St. Albans, England, assignors to Imperial Chemical Industries Limited, Millbank, London, England, a corporation of Great Britain
Filed Feb. 9, 1962, Ser. No. 172,237
Claims priority, application Great Britain, Feb. 10, 1961, 5,014/61
11 Claims. (Cl. 264—95)

This invention relates to a tubular process and apparatus for the production of biaxially oriented thermoplastic film, and to the film so made.

Processes have been described for orienting tubular thermoplastic film by "blowing" or inflation of the tube at a temperature suitable for orientation, usually below the melting point of the thermoplastic. In such processes, for instance, a tube of thermoplastic may be melt extruded from a die, cooled or quenched in a cooled "sizing die" or in a water bath, passed between "take-off nip rollers," then inflated by gaseous pressure to stretch it laterally and longitudinally to biaxially orient it, and finally hauled off by "draw nip rollers" which supply some of the longitudinal stretching tension and seal off the tube against escape of the inflating gas.

We have perceived the need for a process in which the "take-off nip rollers" are not used. The object of this invention is to provide such a process and apparatus for carrying it out.

The invention provides a tubular process for the production of oriented thermoplastic film wherein a tube of thermoplastic is extruded from an extrusion die in association with which are means to prevent an inflation pressure from rupturing the tube, any volatile liquids are evaporated off and/or the tube is cooled either before or after emerging from the body of the equipment containing the extrusion die, whereby the tube is rendered non-sticky as hereinafter defined; control of the rate of feed of the tube is facilitated by passing it through or over a friction brake (which may form part of the body of equipment containing the extrusion die or may be separate from it) thereby supporting the tube against part of the longitudinal stretching force and preventing it from being pulled uncontrollably away from the die, the tube is heated, if necessary, to adjust its temperature to that suitable for orienting the thermoplastic; and the tube is then inflated by gaseous pressure and longitudinally hauled off at a rate greater than that at which it is fed thereby to stretch and biaxially orient it.

The invention also provides an apparatus for a tubular process of producing oriented thermoplastic film comprising a die for extrusion of a tube having within it a passage for the supply of an inflating gas to within the tube and associated with the die a means for preventing an inflation pressure from rupturing the tube; mounted around the axis of the extrusion die and adjacent to it or spaced from it as desired a friction brake constructed to prevent the tube from being uncontrollably pulled away from the die and to facilitate control of the rate of feed of the tube; and, mounted on the axis of the die and friction brake but beyond the latter, a means for hauling off a tube of film produced by inflation of the tube while trapping the inflating gas within it.

"Non-sticky" is defined as being sufficiently so for those parts of the tube which come into contact with the said friction brake not to stick to it or to be marred by it.

A friction brake constructed to carry out any of the above defined processes may comprise a ring like or cylindrical member capable of adjustment of its diameter, whereby the friction exerted by it may be controlled, and it has surfaces shaped to contact the tube without scratching, flattening or permanently deforming it. The friction brake may be mounted inside or outside the tube to expand against it or contract round it as the case may be. The control of the friction brake may be mechanical, by means of fluid pressure, or by varying the temperature of the tube to adjust its diameter relative to that of the friction brake, as desired.

If the tube is extruded as a solid (referred to below) the friction brake, which is then preferably part of the extrusion die may have no means to adjust the friction provided by it, for instance it may be a cylinder or ring of fixed diameter in which case control of the rate of feed of the tube to a desired speed is accomplished by controlling speed of the extruder. Care should then be taken to see that tube of constant wall thickness is extruded and that the rate of haul off of the haul off means is matched to the rate of feed of the extruder. Control may also be by control of the temperature in the extrusion die.

Conveniently in conjunction with the friction brake there is a speed sensitive device responsive to the rate of feed of the tube, and a device constructed and arranged to respond to the speed sensitive device and actuate the friction brake so that an increase in speed of the tube causes an increased friction to be applied to it and likewise a decrease in speed thereof causes a decreased friction to be applied to it.

The means to prevent the tube from being ruptured by the inflating fluid pressure may comprise an external solid support such as a tube. For instance, the tube may be extruded as a solid from an evaporatively cooled die according to British specification No. 820,620. For instance, when a sizing die is used to cool the tube is to have the opening of the sizing die so close to the extrusion die lips that the pressure difference between the inside and outside of the tube does not rupture it.

The said means may also comprise means to surround the tube with a gas at a pressure near to or equal to that inside the tube so that undue inflation does not take place.

The said means may, further, comprise a baffle constructed so that it can be inserted into the tube in advance of where the tube stretches, which baffle is constructed to form a seal with the tube and to isolate the inflation pressure from the pressure inside the tube near to the die, in combination with a pipe through which the inflation gas pressure at the region of inflation may be adjusted.

The baffle or the location referred to hereafter may comprise an internal air bearing. For instance, it may be formed from a cylinder of sintered metal, to the interior of which air is supplied under pressure. The cylinder is inserted into the tube to form a small gap between it and the tube and provides a frictionless guide in addition to a pressure seal. Means are then provided to adjust the gas pressure on either side of the baffle or locator as desired. Conveniently such means may comprise pipes leading from the die to both sides of the baffle or locator.

When a sizing die is used to cool the tube, the internal pressure near the die is preferably somewhat above the external pressure, thereby providing improved sizing in the sizing die.

The process of the invention is particularly applied to tube which has been melt extruded, and more particularly where after melt extrusion it is quenched. It could, however, be applied to tubes which have been extruded from a solution or dispersion of the thermoplastic in a volatile liquid and the volatile liquid evaporated off. It could also be applied to a tube which has been melt extruded and then allowed to cool without quenching to below a temperature at which the tube is sticky.

Preferably, for ease of operation, after passage through the friction brake, the tube is heated to orientation temperature by means of radiation, e.g. infra-red radiation. More preferably, for better control of such heating, the radiation is supplied in two stages, most of the heat being supplied from, e.g. a first radiant, i.e. infra-red heater, whereupon the heat supplied is allowed to become more evenly distributed throughout the layers of the tube which are heated, and the tube is heated to the orientation temperature by heat supplied from a second radiant heater spaced apart from the first.

A further preferred method of heating, which has the advantage of allowing the use of a more compact apparatus and permits more uniform heating, is to supply the heat for orientation from at least two radiant heaters, one surrounding the outside of the tube and the other centrally inside it. Thus the radiant heating means comprises an external radiant heater which surrounds the tube, and an internal radiant heater which is centrally mounted within the tube and is attached to a support extending from the die. Preferably the internal radiant heater is provided with a locator mounted on the support near to the heater, which locator is constructed to be capable of lightly contacting the internal wall of the tube. The locator improves the centering of the internal heater to reduce eccentric heating effects.

Operation of the process according to the invention and apparatus suitable therefor will now be described by way of example.

Figure 1:
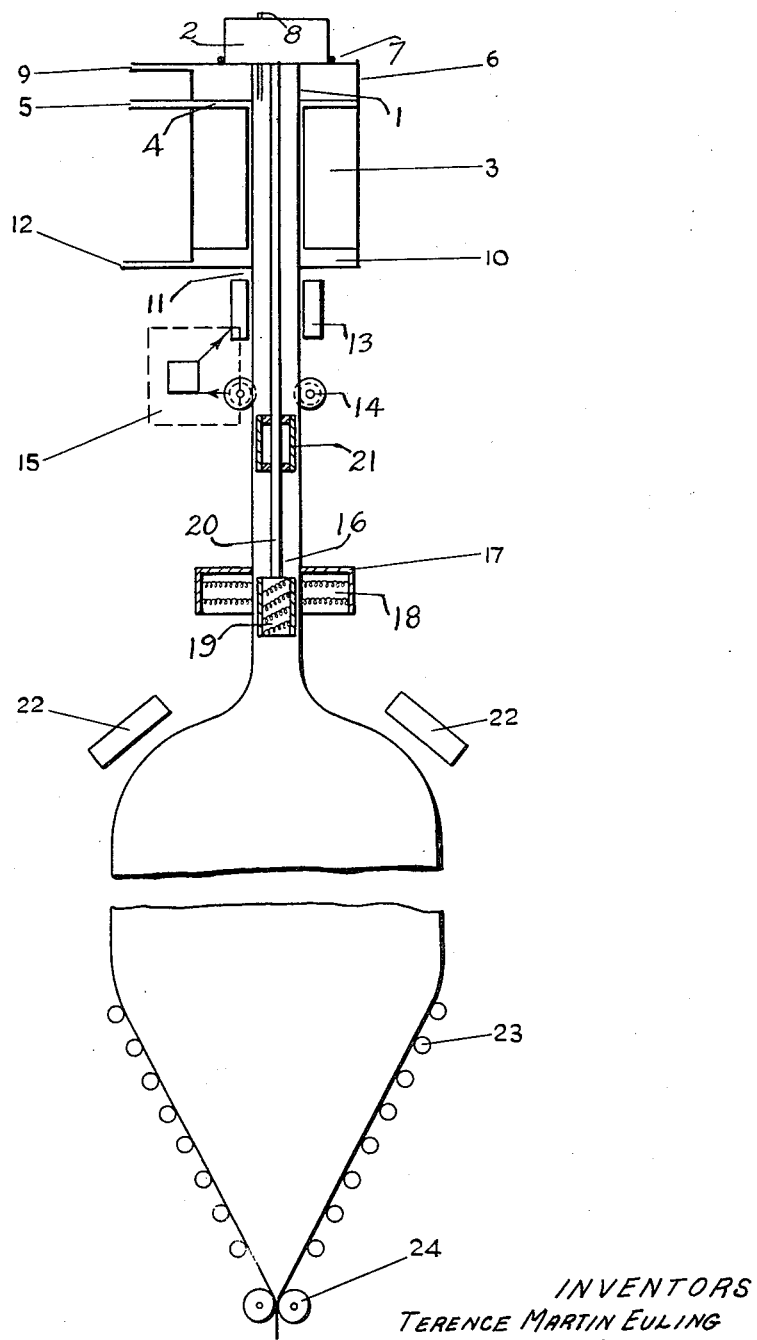
FIGURE 1 is a partly diagrammatic and partly sectional elevation of a film making system in which a tube is downwardly extruded.

In FIGURE 1, a tube of thermoplastic 1 is melt extruded from a die 2, is passed through a sizing die 3 internally cooled (by means not shown) and lubricated by water 4 supplied from a pipe 5. The space surrounding the tube 1 between the die 2 and sizing die 3 is enclosed by a housing 6 attached to the die by a thermal insulator 7. Inflating pressure is supplied to the tube through a pipe 8 and a pipe 9 supplies a somewhat lower pressure to the housing 6. The lower end of the sizing die 3 is provided with a vacuum suck-off device 10 having a rubber diaphragm 11 which makes a seal against the tube. Vacuum is applied to the suck-off device 10 via a pipe 12. The purpose of the suck-off device is to remove the water lubricant supplied above the sizing die and to increase the sizing pressure at the bottom of the sizing die.

The tube now passes through a friction brake 13 and past rollers 14 which actuate a speed sensitive device and a device responsive thereto for increasing the friction of the friction brake as the speed of the tube increases and decreasing it as the speed of the tube decreases. Such a device is indicated diagrammatically within the area 15 bounded by a dotted line.

The tube next passes through an aperture 16 in a baffle 17 mounted on top of an annular external infra-red heater 18. An internal infra-red heater 19 (enclosed in a quartz cover which reduces convention inside the tube) is mounted in alignment with the external infra-red heater on a tube 20 which in turn is mounted on the die 2. A locator 21 comprising a sand blasted and chromium plated brass cylinder (or alternatively an air bearing and means to adjust the pressure on either side of the locator as aforementioned) locates the internal infra-red heater, being mounted in the tube 20. Thermal insulation is provided between the heater 19 and the tube 20. The electric leads (not shown) for the internal infra-red heater 19 are mounted inside the tube 20. The internal infra-red heater 19 may be rotated continuously during the operation of the process to reduce any non-uniformity of heating of the tube. Also to reduce non-uniformity of heating, the internal heater may be mounted at a somewhat lower position than that shown in FIGURE 1 so that any effect caused by the internal heater being off-centre is minimised.

The tube is now inflated as a result of being heated to the orienting temperature by the heaters 18 and 19. Further infra-red heaters 22 are provided to maintain substantially isothermal stretching conditions (by raising them somewhat, they can also be used to locate the drawpoint just below the heaters 18 and 19).

The inflated tube of film is finally collapsed by guide rollers 23 and flattened to prevent escape of the inflatory air by nip rollers 24.

To reduce the effects of convection from the internal heater 16, the air between it and the locator 21 may be replaced continuously by supplying and removing air through the tube 20.

Figure 2:
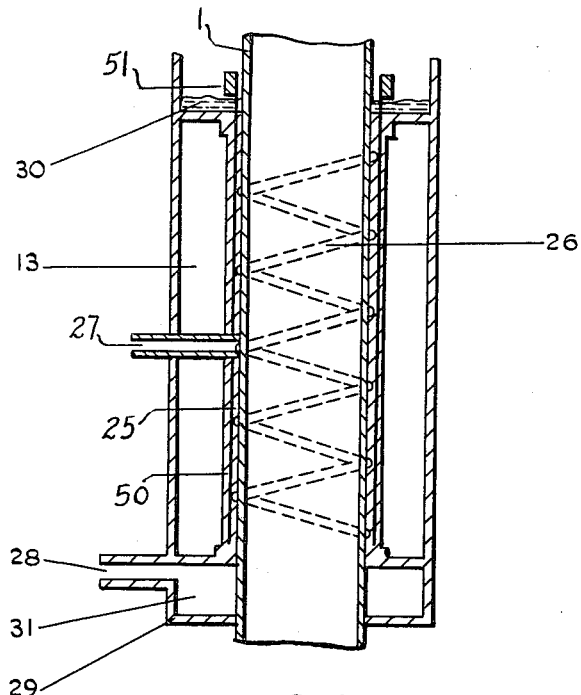
FIGURES 2, 3 and 4 are diagrammatic sectional elevations of part of the tube and three alternative friction brakes.

In FIGURE 2 a tube of thermoplastic 1 is passed through a friction brake 13 comprising a shaped cylindrical flexible sleeve of moulded rubber 25 which is reinforced by longitudinal steel wires 50 anchored to an annular support ring 51 (attached to the housing by means which are not shown). This is provided with a spiral channel 26 to which vacuum may be applied from pipes 27 and 28. Water 30 may be supplied to the film for cooling through the sleeve with little change in its braking characteristics and may be removed by the suck-off device 31 which has a rubber ring seal 29. A higher vacuum may be applied by the pipe 27 than by pipe 28. If desired pressure may be applied to the surrounding chamber to assist the vacuum forces.

Figure 3:
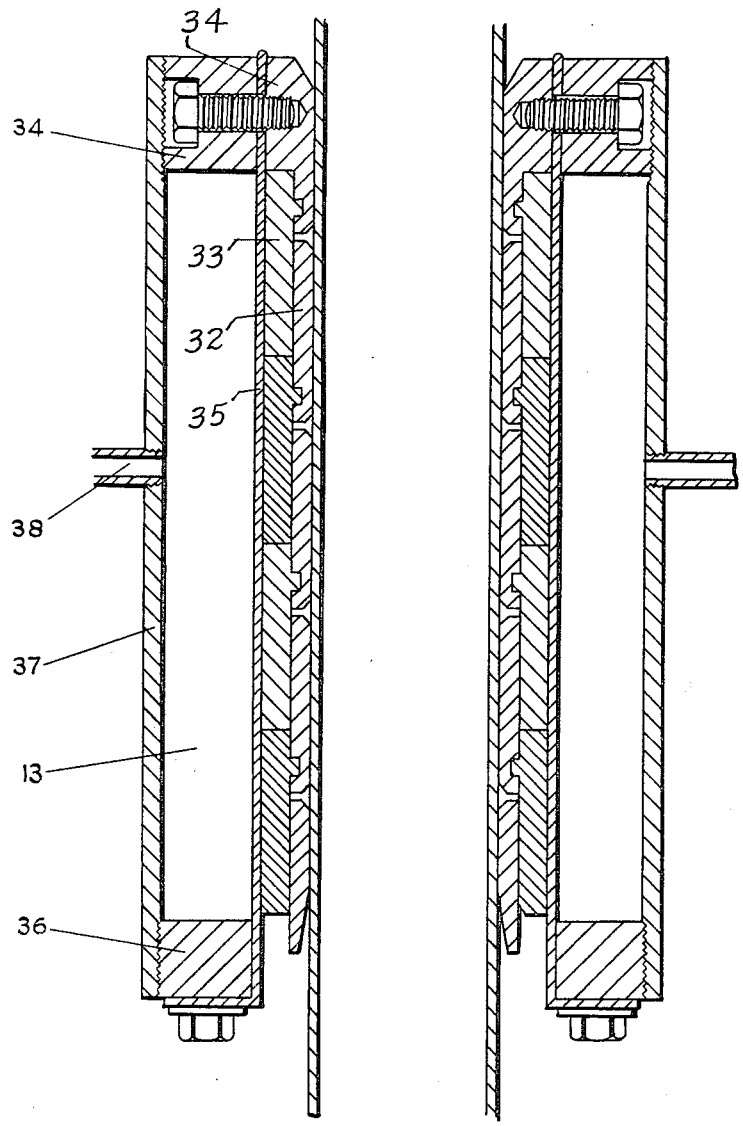
Figure 7:
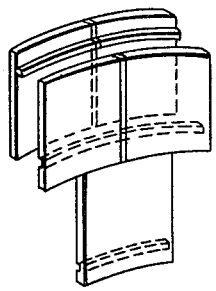
FIGURE 7 shows, diagrammatically, a perspective of some of the segments of the friction brake of FIGURE 3 showing the overlapping of the segments.

In FIGURE 3 a circumferential brass cylinder 32 sawn or milled into several segments which are brazed to overlapping segments of a steel cylinder 33 forms a friction brake element capable of adjusting its diameter. The overlapping of the segments is shown in FIGURE 7. The joints are close fitting (but there are small gaps to allow contraction) and are chamfered so that the film is not marked. The segments interlock in the longitudinal direction as shown being supported from support members 34. A rubber sleeve 35 is sealed at each end to the members 34 and to a ring 36. The outer support member 34, the ring 36 and an outer steel cylinder 37 form a chamber to which a fluid under pressure can be admitted by the pipe 38 to adjust the degree of friction provided. The fluid pressure may be gaseous or hydraulic pressure as is convenient.

Figure 4:
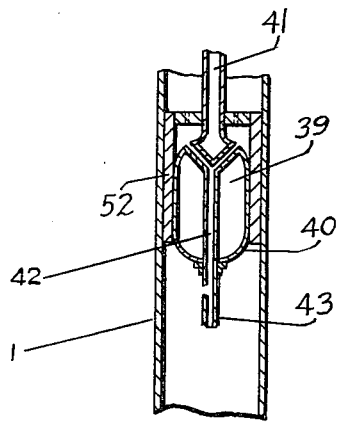

In FIGURE 4 a circumferential brass ring 52 split into several segments (having sliding joints arranged similarly to those in FIGURES 3 and 7) is mounted inside the tube 1 on an expandable bag 39 having elastic walls 40. The bag is mounted on a tube 41 through which fluid pressure is supplied to it. A pipe 42 allows the tube 1 to be at the same pressure above and below the bag. A continuation 43 of the pipe 42 may carry an internal infra-red heater if desired.

Figure 5:
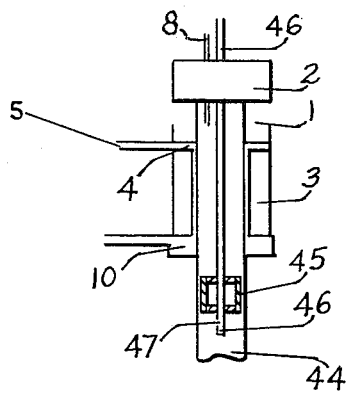
FIGURE 5 is a diagrammatic elevation of part of the system of FIGURE 1 showing an alternative arrangement for reducing the pressure difference inside and outside the tube near the die so that the molten tube is not unduly inflated or burst.

In FIGURE 5 (in which the reference figures correspond to those used in FIGURE 1), the space surrounding the tube 1 between the die 2 and sizing die 3 is open to the atmosphere and the interior of the tube near the die is maintained a little above atmospheric pressure to assist on sizing the tube, by means of a pipe 8 through the die. The inflation pressure present in the tube at 44 is isolated from the pressure near the die by a baffle 45 which may be a cylinder of sand blasted chromium plated brass or an air bearing as aforesaid attached to a tube 46 which is mounted on the die 2 and which carries the internal infra-red heater 19 (not shown, see FIGURE 1). Inflating pressure is supplied through the tube 46 via an aperture 47 leading to the part of the tube to be inflated. The electric leads (not shown) for the infrared heater 19 are passed up the tube 46.

Figure 6:
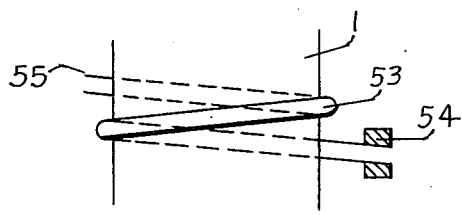
FIGURE 6 is a diagrammatic representation of the application of a Bourdon tube as a friction brake.

In FIGURE 6 the tube 1 is passed through a spiral Bourdon tube 53 of polished brass through which is passed cooling water under pressure. The Bourdon tube 53 is anchored at one end 54 but is slidably mounted at the other end 55. The water pressure causes the spiral to open and release the tube while reduction in the water pressure causes the spiral to contract round it. If desired an internal Bourdon tube could be used to replace the friction brake of FIGURE 4.

The speed sensitive device (at 15, FIGURE 1) may be a tachometer or like centrifugal device having a mechanical or hydraulic output which may be made to actuate the friction brake via a servo-mechanism or hydraulic relays of known type, for instance by controlling a fluid pressure supplied to the friction brakes shown in FIGURES 2 to 4. Alternatively the speed measuring device may be electric generator whose voltage output is a function of the speed. The voltage may then control the said fluid pressure via relays or electronic devices in known manner.

The type of friction brake used naturally depends on the friction to be applied. For low frictions, vacuum devices such as that shown in FIGURE 2 may be adequate, as when stretching thin tubes. For high frictions it may be necessary to use devices such as those shown in FIGURES 3 and 4 and for very high frictions it may be necessary to use both of the devices of these figures in alignment with each other around and inside the tube. Alternatively a stationary mandrel may be used inside the tube in alignment with the brass ring of FIGURE 3 or the Bourdon tube of FIGURE 6; or a stationary external cylinder may be provided in alignment with the brass ring of FIGURE 4 or an internal Bourdon tube.

As an alternative to the use of a water lubricated sizing die, there may be used instead, a sizing die whose inner surface has been sand blasted and chromium plated, which die is used dry. In this case the suck-off device 10 may be omitted or may be present to increase sizing pressure.

We have found that at high speeds of operation of the already described processes, for instance at rates of tube extrusion above 10 ft./min., it is difficult to cool the inside of the melt extruded tube to any large extent. As a consequence, the opposed sides of the tube when passed between the "take off nip rollers" tend to be heat sealed together. This is particularly likely to happen when the thermoplastic is melt extruded at high temperature (i.e. in the range of 250–300° C.) as in the case of isotactic polypropylene. Further, it is desired to stretch the tube with a high stretch ratio, for instance, an isotactic polypropylene tube; to an area stretch ratio of 40:1 to 100:1, thick-walled tubes may have to be stretched to obtain film more than, say 0.001 inch thick, when such thick-walled tubes are flattened by nip rollers they tend to crack at the crease. The process of this invention avoids these difficulties.

A further advantage of the invention arises from the lack of the creases made in the tube by "take off nip rolls." Such creases cause weaknesses in and may disfigure the stretched film. By following this invention lay flat film can be obtained free from weaknesses due to such creasing in the "take off nip rolls" and the lay flat film may be slit down one edge only and the tube opened out to a "flat film." In this way the size of the inflated tube of film may be halved for the same width of flat film produced (compared with the case in which lay flat film is slit at both edges because of weakness at the edges due to the creasing caused by the "take off nip rollers").

The process of the invention may be applied to any thermoplastic which is capable of being biaxially oriented. For instance, linear polyesters, e.g. polyglycol terephthalates such as polyethylene terephthalate and copolymers of isophthalic and terephthalic acids with a glycol; vinylidene chloride polymers and copolymers, e.g. those containing 80–95% (by weight) vinylidene chloride and 20–5% of acrylonitrile residues, and copolymers thereof with vinyl acetate or vinyl chloride; vinyl chloride, polyamides such as the nylons; polystyrene and other polyolefines, particularly the highly crystallisable linear olefine polymers and copolymers (i.e. those which can have a degree of crystallinity above 50% as measured by X-ray diffraction), and more particularly such polymers wherein the olefin has between 2 and 6 carbon atoms in the molecule, e.g. linear polythene and polymers and copolymers of propylene which are at least 75% insoluble in boiling n-heptane such as isotactic polypropylene; cellulose esters; rubber hydrochloride, and such film forming proteins as are capable of biaxial orientation.

When the process is applied to relatively thin or flexible tubes such as polyethylene terephthalate tubes, care should be taken to ensure that the tube is adequately gripped by the friction brake. The grip is easily obtained to an adequate degree if an internal brake such as that of FIGURE 4 is used.

In the operation of the process described with reference to the drawings in which an internal infra-red heater is used, care should be taken not to apply too much heat from the inner heater, especially if the passage of the tube through the apparatus is relatively rapid, since the inner surface of the tube will under these conditions be hotter than the outside surface just before the tube enters the heaters (because it has been sized and cooled externally); the inner surface of the tube therefore requires considerably less heat to bring it to the stretching temperature. The result of over-heating is a high frequency of burst of the expanding tube.

We claim:
1. In a process for the orienting of tubular thermoplastic film including the steps of melt extruding a tube of thermoplastic material, cooling the tube of thermoplastic material, forwarding the tube and then inflating it with gas under pressure to stretch it laterally and longitudinally to biaxially orient it, and then hauling the tube off under longitudinal stretching force while sealing the tube off against escape of inflating gas, the improvement comprising preventing the inflating gas pressure from rupturing the tube in association with the extruding step, evaporating off volatile liquids present and cooling the tube whereby the tube is rendered non-sticky so that it will not adhere to any surface with which it may come into contact, thereafter controlling the rate of feed of the tube by peripherally frictionally engaging the tube with at least one coaxial cylindrical member, the pressure of such engagement being directly proportional to the rate of feed of the tube thereby partially restraining the tube against the effect of the longitudinal stretching force without collapsing the tube and preventing it from being pulled uncontrollably away from the extruding step, heating the tube to adjust its temperature to that suitable for orienting the thermoplastic material, and then inflating the tube and longitudinally hauling the tube off at a rate greater than the rate of feed to thereby stretch and biaxially orient it.

2. An apparatus for a tubular process of producing an oriented thermoplastic film comprising the combination of a die for the extrusion of a tube of thermoplastic material having within it a passage for the supply of an inflating gas under pressure to within the tube for inflation thereof, associated with a die a means for preventing the inflating pressure from rupturing the tube and means to evaporate off from the tube any volatile liquid and render the tube solid, a stationary friction brake mounted around the axis of the extrusion die but spaced axially from the die, said friction brake being adapted to bear against at least part of a surface of the tube and be in frictional contact therewith, the surface of the friction brake in contact with the tube conforming substantially to the curvature of the uncollasped extruded tube, means for generally radially reciprocating said friction brake surface to vary the frictional drag exerted by the friction brake on said tube surface to control the rate of feed of the tube and prevent the tube from being uncontrollably pulled away from the die, a heating means for heating the thermoplastic material of the tube to orientation temperature and thereby provide for inflation of the tube through the inflating gas trapped therein, and mounted on the axis of the die and friction brake but beyond the latter, a means for trapping the inflating gas within the tube for inflation and for hauling off the tube of film produced by the inflation.

3. An apparatus according to claim 2 which is adapted to extrude the tube as a solid from the extrusion die, the friction brake being part of the extrusion die.

4. An apparatus according to claim 2 in which in conjunction with the friction brake there is a speed sensitive device responsive to the rate of feed of the tube, and a device constructed and arranged to respond to the speed sensitive device and actuate the friction brake so that an increase in speed of the tube causes an increased friction to be applied to it and likewise a decrease in speed thereof causes a decreased friction to be applied to it.

5. An apparatus according to claim 2 in which the means to prevent the tube from being ruptured by the inflating fluid pressure comprises an external solid support.

6. An apparatus according to claim 2 in which the means to prevent the tube from being ruptured by the inflating fluid pressure comprises a baffle constructed so that it can be inserted into the tube in advance of where the tube stretches, which baffle is constructed to form a seal with the tube and to isolate the inflation pressure from the pressure inside the tube near to the die, in combination with a pipe through which the inflation gas pressure at the region of inflation may be adjusted.

7. An apparatus according to claim 2 in which there are at least 2 infra-red heaters whereby the tube may be heated to the orientation temperature, the said heaters being spaced apart so that most of the heat may be supplied to the tube from a first heater and the rest of the heat may be supplied by a second heater.

8. An apparatus according to claim 2 in which the friction brake comprises a radially expansible and contractile, generally tubular member and wherein said friction brake surface comprises the radially inner peripheral surface of said tubular member.

9. An apparatus according to claim 8 wherein said tubular member comprises a plurality of angularly spaced arcuate segments; said means for generally radially reciproating said friction brake surface including: an inflatable, at least partly resilient sleeve circumferentially surrounding said segments and means communicating said segments to said sleeve whereby inflation of said sleeve moves said segments generally radially inwardly and deflation of said sleeve moves said segments generally radially outwardly.

10. An apparatus according to claim 2 in which the friction brake comprises a radially expansible and contractile generally tubular member and wherein said friction brake surface comprises the radially outer peripheral surface of said tubular member; said tubular member comprises a plurality of angularly spaced arcuate segments; and wherein said means for generally radially reciprocating said friction brake surface includes an inflatable resilient bag, said segments circumferentially surrounding and communicating with said bag whereby inflation of said bag moves said segments generally radially outwardly and deflation of said bag moves said segments generally radially inwardly.

11. An apparatus for a tubular process of producing an oriented thermoplastic film comprising the combination of a die for the extrusion of a tube of thermoplastic material having within it a passage for the supply of an inflating gas under pressure to within the tube for inflation thereof, associated with the die a means for preventing the inflating pressure from rupturing the tube and means to evaporate off from the tube any volatile liquid and render the tube solid, a stationary friction brake mounted around the axis of the extrusion die but spaced axially from the die, said friction brake being adapted to bear against at least part of the surface of the tube and be in frictional contact therewith to control the rate of feed of the tube and prevent the tube from being uncontrollably pulled away from the die, the surface of the friction brake in contact with the tube conforming substantially to the curvature of the uncollapsed extruded tube; means for generally radially expanding and contracting said friction brake on said tube surface to control the rate of feed of the tube and prevent the tube from being uncontrollably pulled away from the die, a heating means for heating the thermoplastic material of the tube to orientation temperature and thereby provide for inflation of the tube through the inflating gas trapped therein, and mounted on the axis of the die and friction brake but beyond the latter, a means for trapping the inflating gas within the tube for inflation and for hauling off the tube of film produced by the inflation; the friction brake comprising a radially expansible and contractile spirally wound tubular member having two ends; said spirally wound tubular member circumferentially surrounding and engaging the exterior peripheral surface of said tube of thermoplastic material; one of said tubular member two ends being fixedly mounted, the other of said two ends being slidably mounted; said tubular member being adapted to receive a pressurized fluid whereby communication of increased fluid pressure to said tubular member radially expands the spiral described thereby and communication of decreased fluid pressure to said tubular member allows radial contraction of the spiral described thereby.

References Cited by the Examiner

UNITED STATES PATENTS

| | | | |
|---|---|---|---|
| 1,386,813 | 8/1921 | Townsend | 226—39 |
| 2,634,459 | 4/1953 | Irons | 264—95 |
| 2,862,234 | 12/1958 | Gerber | 18—57 |
| 2,961,711 | 11/1960 | Diedrich et al. | 18—57 |
| 2,966,700 | 1/1961 | Dyer et al. | 264—95 |
| 2,979,777 | 4/1961 | Goldman | 18—57 |
| 3,091,807 | 6/1963 | Turner et al. | 264—95 |

ALEXANDER H. BRODMERKEL, *Primary Examiner.*

MICHAEL V. BRINDISI, *Examiner.*